United States Patent Office 2,897,587
Patented Aug. 4, 1959

2,897,587

METHOD OF FABRICATING SEMICONDUCTOR DEVICES

George L. Schnable, Lansdale, Pa., assignor to Philco Corporation, Philadelphia, Pa., a corporation of Pennsylvania No Drawing. Application May 23, 1955
Serial No. 510,536

1 Claim. (Cl. 29—487)

The present invention relates to a novel method of joining articles together by means of molten metal; and, more particularly, it relates to a novel method of soldering metal members. The invention also relates to a novel assembly comprising a plurality of members joined together by means of an intermediate bonding phase comprising a metal alloy.

Presently available low-melting alloy solders possess limitations which render inconvenient or impossible their use in many applications. Thus, in the manufacture of parts for electrical and electronic equipment, particularly semi-conductor devices, it is often desired to subject the soldered assembly to a "clean-up" etch. Etching baths employed for this purpose generally comprise mixtures of nitric acid, hydrofluoric acid and water. The constituent elements of the conventional solders, however, contaminate the etching solution, in many cases becoming deposited out on the surfaces of the soldered assembly and resulting in deterioration of the desired electrical properties. For example, in one form of transistor, a whisker wire is soldered to an indium electrode which has been alloyed into a germanium wafer base. With the use of the common low-melting alloy solders, such as bismuth-lead-tin-cadmium alloy (Wood's metal), bismuth-lead-tin-cadmium-indium alloy, bismuth-lead alloy, tin-indium alloy, and the like, used as the solder, it has been found that one or more of the constituent elements thereof especially the tin and bismuth, contaminate the clean-up etching bath, plating out on the indium and germanium surfaces and deleteriously affecting the electrical properties of the assembly. In addition, certain of the low-melting metals and alloys are so soft that, when employed as a solder, strains and stresses on one or the other of the joined elements lead to breakdown of the joint. Other suggested metals and alloys which may not contaminate the etching bath melt too high to be usable in many instances since their use would result in melting of one or more of the metal elements to be soldered.

It is the principal object of the present invention to provide a novel method of joining articles together.

Another object of the present invention is to provide a novel method of soldering.

Still another object is to provide a novel method of soldering together metal members in the fabrication of electrical and electronic assemblies which can then be subjected to a clean-up etch without danger of contaminating the etching bath, plating out constituent elements of the solder on to the assembly, or deleteriously affecting the electrical properties of the assembly.

A further object of the present invention is to provide a novel method for soldering involving the use of a low melting alloy of relatively high hardness forming a strong joint not susceptible to breakdown upon the application of strains and stresses on one or the other of the joined elements.

Other objects, including the provision of a novel soldered assembly, will become apparent from a consideration of the following specification and the claim.

The method of the present invention comprises bringing together the members to be soldered with a molten indium-cadmium alloy in bonding relationship therebetween, and permitting the cadmium-indium alloy to solidify. As will appear hereinafter, the terms "solder," "soldered" and "soldering" refer generally to joining together of solid articles, either metallic or non-metallic, but preferably the former, by means of a molten metal permitted to solidify in situ at the juncture of the articles to be joined.

The alloy employed as solder in accordance with the present invention possesses many advantages over conventional solders. In the molten state it wets other materials very well. Depending upon the particular flux or fluxes employed, it can be used to bond together elements of any metal that can normally be soldered, including steel, aluminum, nickel, copper, platinum, gold, silver, indium, germanium, silicon, alloys of one or more of the above, as well as other alloys such as lead-antimony alloys, and inter-metallic compounds like inter-metallic semi-conductors, such as indium-antimony (InSb), and the like. The alloy can also be used to solder together non-metallic materials or metal elements to non-metals, such as non-metal semi-conductors, for instance zinc sulfide, barium titanate, quartz, and the like. It has been found that when an assembly which has been soldered with the alloy employed in accordance with the present invention is subjected to a clean-up etch in aqueous solutions of, for example, nitric acid and/or hydrofluoric acid, there is no danger of the solder constituents dissolving in the bath and redepositing out on the assembly. The indium-cadmium alloy will flow at 122.5° C. and hence can be used to solder a wide variety of materials without deleteriously affecting the elements being soldered. Moreover, the alloy is relatively hard, as compared, for example, with indium itself, so that elements, such as wires, soldered therewith will not readily work loose through movement.

Referring further to the alloy, a combination of 25% cadmium and 75% indium, by weight, forms a eutectic having a melting point of 122.5° C. Solders with a solidus point as low as this temperature can readily be prepared with widely varying proportions of indium and cadmium. Cadmium-indium alloys containing up to 82% indium, by weight, form the eutectic, and thus have a solidus temperature of 122.5° C. Cadmium-indium alloys containing more than 82% indium form solid solutions, having progressively higher melting points, and alloys containing above about 85% of indium have melting points too high and such increase in softness as to offer little advantage over the use of other suggested solders. In cadmium-indium alloys containing less than about 75% of indium, the cadmium is in suspension in the molten eutectic mixture. Compositions of this type can readily be employed as solder since they are flowable and will wet the metal surfaces to which they are applied. In this connection, the alloy employed in accordance with the present invention may contain as low as about 40% indium, by weight. The cadmium-indium alloys containing between about 60 and about 80% indium, by weight, are particularly suitable and constitute the preferred alloy solders employed in accordance with the present invention. A cadmium-indium alloy having a composition of about 25% cadmium and about 75% indium is especially advantageous.

Although the alloy will consist essentially of indium and cadmium in the percentage ranges set forth above, this does not exclude the presence of a small amount, such as up to about 5%, by weight, of another metal or metals which does not deleteriously affect the advantageous properties of the alloy.

The alloy solder may be prepared following a wide variety of specific procedures most of which are well known in the art of alloy preparation. The indium and the cadmium may be mixed and heated, or one or the other of the metals may be melted, following which the other metal is added thereto. The alloy may also be prepared by an electro-plating procedure. Thus, the indium and cadmium, either separately or at the same time, may be plated out of solution onto, for example, the metal member to which it is desired to apply the solder. If the electroplating operation takes place at a temperature below the melting point of the alloy, it may be necessary to heat the plated metals to cause melting and hence formation of the alloy. On the other hand, the electroplating operation may take place at a temperature such that the alloy is plated out as such in molten form. This procedure is particularly advantageous in providing a body of the alloy at the end of one of the metal members to be joined where the element is, for example, a wire or strip. This type of procedure is disclosed and claimed in copending application Serial No. 510,164, filed May 23, 1955, now Patent Number 2,818,-375. A particularly suitable bath for electroplating the alloy and its use is disclosed and claimed in copending application Serial No. 510,504, filed May 23, 1955, now Patent Number 2,818,374, and the electroplating of various metals, including the alloy employed in accordance with the present invention, from a bath of molten zinc chloride and ammonium chloride is disclosed and claimed in copending application Serial No. 544,375, filed November 1, 1955 (now Patent Number 2,845,387) as a continuation-in-part of application Serial No. 510,537, filed May 23, 1955 (now abandoned).

As stated, in accordance with the process of the present invention, the members to be joined are brought together with the defined indium-cadmium alloy, in molten form, in bonding relationship therebetween. That is to say, the members are assembled in the desired relationship with a molten body of the stated indium-cadmium alloy in contact with and wetting each member so that upon freezing of the alloy the members are all joined through the agency of the solidified body of solder. The solder may be applied in accordance with usual soldering procedure. For example, the members may be brought together and the solder, in molten form, applied to the junction, following which the solder is cooled. On the other hand, the solder may be applied, in molten form, to one or the other or both of the members and solidified thereon, following which the members are brought together, and heat applied to melt the solder whereby it flows and contacts each member. The assembly may then be cooled so that the solder solidifies at the junction between the members. The solder may be applied to one or more of the members, as stated above by electroplating the indium and cadmium either in separate layers of the constituent elements or as a single, mixed layer, or the end of one or more of the members may be dipped into a pool of the molten solder. Another method by which the members may be soldered is in accordance with the immersion soldering procedure generally disclosed and claimed in copending application Serial No. 514,812, filed June 13, 1955, now Patent Number 2,842,841.

As is usual in soldering operations, a suitable flux will be employed to clean and facilitate wetting of the surfaces of metal members to be joined by the solder. The particular type of flux employed will, of course, depend upon the nature of the members to be soldered as well known in the soldering art, and resin type fluxes or "acid" type fluxes may be employed. As far as the solder itself is concerned, it is also preferred to employ a flux therefor, and any of the conventional resin or acid type fluxes may be used for this purpose. Of the acid type fluxes, the acid chlorides are particularly suitable, and examples of fluxes of this type are hydrochloric acid, zinc chloride, ammonium chloride, molten mixtures of zinc chloride and ammonium chloride, and the like.

The process of the present invention will be more readily understood from a consideration of the following specific example which is given for the purpose of illustration only and is not intended to limit the scope of the invention in any way.

*Example*

A 25% cadmium-75% indium alloy, in the form of a piece of 10 mil wire, one-quarter inch long, is placed in a ceramic crucible after which there is added to the crucible a 3:1 mixture of anhydrous zinc chloride and ammonium chloride. The crucible is then heated to melt the salts and the alloy, the latter of which forms a small sphere of molten metal at the bottom of the crucible covered with the molten salt mixture.

The tip of a nickel wire 5 mils in diameter is then immersed in this bath so that the sphere of molten alloy adheres thereto. Upon removal of the wire the sphere of alloy is retained at the tip as a small bead.

The tip of the wire is then touched to an indium electrode which has been fused to a germanium wafer. The assembly is heated to melt the solder bead which, upon cooling and solidifying, unites the end of the whisker wire to the electrode.

The assembly is subjected to a clean-up etch in an aqueous solution of hydrofluoric acid and nitric acid without contamination of the bath or plating out of metal on the nickel, indium or germanium surfaces. Movement of the nickel wire does not cause it to work loose at the soldered joint.

Considerable modification is possible in the selection of members bonded as well as in the exact techniques employed without departing from the scope of the present invention.

I claim:

In the fabrication of a semiconductor device comprising the steps of soldering a conductor to a structure including a body of semiconductive material and then subjecting the soldered assembly to a clean-up etch in an aqueous solution of at least one of the acids selected from the group consisting of nitric acid and hydrofluoric acid, the improvement which comprises employing in said soldering step an alloy consisting essentially of indium and cadmium and containing between about 40 and 80% by weight of indium, whereby substantial deposition of solder components from said etch bath on said semiconductive body is avoided.

References Cited in the file of this patent

UNITED STATES PATENTS

| | | |
|---|---|---|
| 1,651,709 | Jones | Dec. 6, 1927 |
| 2,438,967 | Ellsworth | Apr. 6, 1948 |
| 2,717,840 | Bosch | Sept. 13, 1955 |
| 2,735,050 | Armstrong | Feb. 14, 1956 |
| 2,746,140 | Belser | May 22, 1956 |
| 2,796,562 | Ellis et al. | June 18, 1957 |
| 2,807,561 | Nelson | Sept. 24, 1957 |
| 2,840,885 | Cressell | July 1, 1958 |

FOREIGN PATENTS

| | | |
|---|---|---|
| 591,343 | Great Britain | Aug. 14, 1947 |